US007089546B2

(12) United States Patent
Watanabe et al.

(10) Patent No.: US 7,089,546 B2
(45) Date of Patent: Aug. 8, 2006

(54) UPGRADE FOR NAVIGATION DATA BASED ON USAGE DATA OR INITIALIZATION OF NAVIGATION DATA

(75) Inventors: Shuuji Watanabe, Tokyo-to (JP); Yoshihide Hamaguchi, Kawagoe (JP); Kenichiro Yano, Kawagoe (JP); Satoshi Saitoh, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 813 days.

(21) Appl. No.: 10/137,408

(22) Filed: May 3, 2002

(65) Prior Publication Data

US 2004/0015945 A1    Jan. 22, 2004

(30) Foreign Application Priority Data

May 8, 2001    (JP)    ............................ P2001-137852
May 8, 2001    (JP)    ............................ P2001-137853

(51) Int. Cl.
*G06F 9/44*    (2006.01)

(52) U.S. Cl. .......................... 717/168; 701/200; 707/8; 707/10

(58) Field of Classification Search ................ 717/168, 717/178; 707/8, 10; 701/200, 208; 706/14; 340/995, 15; 342/419, 357, 13
See application file for complete search history.

(56) References Cited

U.S. PATENT DOCUMENTS

| | | | | |
|---|---|---|---|---|
| 4,970,652 A | * | 11/1990 | Nagashima | ................. 701/208 |
| 5,146,228 A | * | 9/1992 | Irani et al. | ..................... 342/64 |
| 5,345,388 A | * | 9/1994 | Kashiwazaki | ................ 701/213 |
| 5,911,773 A | * | 6/1999 | Mutsuga et al. | ............. 701/200 |
| 6,199,203 B1 | * | 3/2001 | Saboff | ......................... 717/168 |
| 6,222,485 B1 | * | 4/2001 | Walters et al. | ......... 342/357.13 |
| 6,351,706 B1 | * | 2/2002 | Morimoto et al. | .......... 701/208 |
| 6,408,233 B1 | * | 6/2002 | Solomon et al. | .............. 701/35 |
| 6,937,936 B1 | * | 8/2005 | Nimura | ....................... 701/208 |
| 6,970,782 B1 | * | 11/2005 | Watanabe et al. | ........... 701/200 |

OTHER PUBLICATIONS

Magellan GPS Pioneer User Manual, P/N 22-60125-000, Magellan Systems Corporation, 1997, pp. 1-42□□.*
Garmin Introduces Portable StreetPilotIII with Auto Routing Voice Prompts for Metro Drivers, News Release, Mobile Electronics, Jan. 6, 2001, 2 pages.*
GPS: Primary Tool for Time Transfer, Wlodzimierz Lewandowski et al, IEEE, Jan. 1999, pp. 163-172.*
Indoor GPS Theory & Implementation, Dr. Frank van Diggelen, IEEE Position, Location, & Navigation, Symposium, 2002, Apr. 2002, pp. 240-247.*

(Continued)

*Primary Examiner*—Todd Ingberg
(74) *Attorney, Agent, or Firm*—Sughrue Mion, PLLC

(57) ABSTRACT

An upgrade method for navigation data is provided with: a memory status of a memory device that is removed from a navigation apparatus is checked and it is determined whether there are the navigation data to be upgraded and the user data to be saved. The user data is saved in a backup memory device. The navigation data is written over with upgraded navigation data. Then, the saved data is read from the backup memory device and rewritten in the memory device as the user data.

15 Claims, 9 Drawing Sheets

OTHER PUBLICATIONS

GPS: Roadside Integrated Precision Positioning System, David Hohman et al, IEEE, Apr. 2000, pp. 221-230.*

NEC and GPS Technology Pioneer Magellan Announce Strategic Partnership, Press Release, Apr. 15, 1999, 2 pages.*

Integrating GPS Data within Embedded Internet GIS, Arunas Stockus et al, ACM, 1999, pp. 134-139.*

On Maximizing Service-Level-Agreement Profile, Zhen Liu et al, ACM, Jan. 2001, pp. 213-223.*

* cited by examiner

UPGRADE FOR NAVIGATION DATA BASED ON USAGE DATA OR INITIALIZATION OF NAVIGATION DATA

BACKGROUND OF THE INVENTION

1. Field of the Invention

This invention relates to an upgrade method for navigation data that upgrades the navigation data that are required for operating functions of a navigation apparatus, and more particularly to a navigation data upgrade method and apparatus for saving used by a memory that is can freely be installed in the navigation apparatus.

2. Description of the Related Art

Conventionally, optical disks, such as DVDs or CDs, have been widely used as a memory means for reading navigation data, such as map data, in a navigation apparatus. When performing navigation with a navigation apparatus having an optical disk, the current position is detected and directions are given using a map image that is created based on the map data that are read from the optical disk.

On the other hand, navigation data, such as map data that are recorded on an optical disk, must correspond to changes in road conditions, and after the data have been used for a certain period of time, it is preferable that the data be properly updated. In order to do this, an optical disk containing the upgrade navigation data is provided to the customer, and by mounting the disk in the navigation apparatus, it is possible to perform navigation in a manner appropriately reflecting the changes in upgraded road conditions.

However, recently, the use of a hard disk as a large-capacity memory is becoming popular, and it is feasible that a hard disk could be installed in a navigation apparatus and used as the memory for navigation data. By using such a hard disk, it would be possible to greatly increase the amount of navigation data that could be stored, as well as it would be possible for the customer to record data, such as a collection of music data, on the empty area of the hard disk, thus enhance the convenience of the navigation apparatus.

When a hard disk is used in a navigation apparatus, the process for upgrading the navigation data as described above becomes more difficult. That is, the recording medium is not simply replaced as in the case of an optical disk, and the business that provides the hard disk, must collect the hard disk from the customer and upgrade the data by writing over the old data.

However, there is the possibility that the customer using the navigation apparatus may wish to retain their own user data that are recorded on the hard disk, even though they also desire to have the navigation data updated. In this case, it is necessary to first back up the customer's user data before upgrading the navigation data, and this becomes troublesome.

When the business performs the upgrade work itself, management of the upgrade process becomes difficult when there are many hard disks to be upgraded, and an increased on overall cost would be anticipated.

Moreover, when the business performs the upgrade work itself, there would be an increase in intermediate costs that would accompany the collecting and returning of the hard disks to be upgraded. Also, when considering the case of having the customers remove and install the hard disk in the navigation apparatus by themselves, some customers may be unaccustomed to handling the hard disk, and is not desirable.

SUMMARY OF THE INVENTION

Taking the above problems into consideration, it is the object of this invention to provide an upgrade method for navigation data and an apparatus for saving user data that would make it possible to retain the customer's user data and relieve the burden on the customer, as well as make it possible for a business to perform upgrading efficiently, when upgrading the navigation data recorded in the memory that is installed in the navigation apparatus.

The above object of the present invention can be achieved by a upgrade method of the present invention for navigation data that writes over and upgrades navigation data in a memory device, which is installed in a navigation apparatus such that it can be freely installed and removed and which stores rewritable navigation data and user data. The method is provided with: a checking process of checking the memory status of the memory device that is removed from the navigation apparatus and determining whether there are the navigation data to be upgraded and the user data to be saved; a user data saving process that depending on the results of the checking process saves the user data, which are stored in the memory device, in a backup memory device such that they can be identified as saved data; a navigation data writing process that depending on the results of the checking process writes over the navigation data, which are stored in the memory device, with upgraded navigation data; and a user data rewriting process of reading the saved data, which correspond to the memory device, from the backup memory device and rewriting the saved data in the memory device as the user data.

With this invention, when upgrading navigation data in the memory device of the navigation apparatus, after the status of the memory of the memory has been checked, upgrading is performed by storing the data that have been determined to be user data in a backup memory such that they can be identified as saved data, then writing over the data that are determined to be navigation data with the upgrade navigation data, and finally reading the saved data from the backup memory and writing them to the memory. Here, the navigation data are map data or other related data that are necessary for the navigation function of the navigation apparatus, and the user data are various kinds of data such as music data that are collected or created by the user. Therefore, it is possible to upgrade the navigation data on the hard disk as well as maintain the user's own user data without it being deleted, and thus there is the merit that the burden of the customer is not increased.

In one aspect of the present invention, a unique user password is set for allowing access to said memory device such that in the checking process, the user password is cleared and the memory device is accessed.

With this invention, a unique user password is set in the memory that is to be upgraded, so upgrading is performed by first clearing this user password and then accessing the memory. Therefore, access is prohibited until the user password for the memory has been cleared, and thus it is possible to protect the user data, as well as access the memory in each of the aforementioned processes.

In another aspect of the present invention, an upgrade password is set such that in the rewriting process, it allows the upgraded memory device to be accessed one time only.

With this invention the user password for the memory is cleared as described above, and an upgrade password is set in the memory for the writing process. Therefore, when the memory is installed in the customer's navigation apparatus after upgrading, the memory is accessed one time only and after that by setting the user password again, it is possible to protect the data recorded in the memory without the customer having to perform any complicated operation.

In further aspect of the present invention, a directory for user data is created in the memory device for recording the user data such that in the checking process it is determined whether there are user data to be saved according to whether or not the directory for user data exists in the memory device.

With this invention, when checking the memory status of the memory, whether or not there is a user directory is determined, and when there is a user directory, a process for saving the user data is executed. Therefore, it is possible to quickly determine whether or not there are user data on the hard disk to be upgraded that need to be saved, and thus it is possible to improve work efficiency.

In further aspect of the present invention, in the checking process a serial number and manufacturer's code that are unique to the memory device are obtained as control data and stored in the backup memory device to connect the control data with the saved data; and wherein in the rewriting process, said control data are referenced to determine the user data that are to be rewritten from the backup memory device.

With this invention, it is possible easily specify the hard disk to be upgraded that corresponds to the saved data from the serial number and manufacturer code that are recorded as control data in the backup memory, and thus it is possible to rewrite the saved user data on the original hard disk.

In further aspect of the present invention, in a hard disk is used as the memory device.

With this invention, a hard disk is used as the memory of the navigation apparatus, so it is possible to freely save a large amount of navigation data as well as the customer's own user data on a widely used typical hard disk, and it is possible to keep a large amount of user data.

The above object of the present invention can be achieved by a upgrade method of the present invention for navigation data that writes over and upgrades navigation data in a memory device, which is installed in a navigation apparatus such that it can be freely installed and removed and which stores rewritable navigation data and user data. The method is provided with a writing over process for writing over the navigation data in the memory device, which has been removed from the navigation apparatus; a saving process for temporarily saving the user data when writing over the navigation data; and a rewriting process for rewriting saved user data in the memory device after the navigation data have been written over.

With this invention, when upgrading navigation data in the memory of the navigation apparatus, the user data from the memory are saved temporarily and the navigation data are written over, then the saved user data are rewritten in the memory. Here, the navigation data are map data and other related data that are necessary for the navigation function of the navigation apparatus, and user data are all kinds of data, such as music data, that are collected or created by the user. Therefore, it is possible to upgrade the navigation data on the hard disk as well as maintain the user's own user data without it being deleted, and thus there is the merit that the burden of the customer is not increased.

In one aspect of the present invention, upgrading is performed upon receiving an application for an upgrade from a customer that owns the navigation apparatus, and is performed for the memory device for which a collection request is received, and wherein execution of the upgrading is managed based on a customer database that contains customer data and where the entire series of work related to the upgrading is managed.

With this invention, when the customer, who owns the memory of the navigation apparatus, applies for an upgrade and requests that the hard disk be collected, the business uses the necessary customer data in the customer database to manage execution of the upgrade of that customer's memory and manage the work that accompanies it, and finally upgrades the navigation data. Therefore, in addition to the merits to the customer mentioned above when upgrading the navigation data, it is possible to better manage all the work for shipping the memory between the customer and business and to improve the work efficiency of the work.

In another aspect of the present invention, series of work related to the upgrading comprises: work of collecting the memory device to be upgraded; work of returning the memory device after having been upgraded; and work of collecting the fee for the upgrading.

With this invention, in addition to the function described above, the business that performs the upgrade of navigation data manages the collection and returning of the memory and the collection of fees, so it is possible to smoothly perform shipment of the memory and thus keep down the intermediate costs of the upgrade.

In further aspect of the present invention, after receiving the application from the customer for the upgrading, work of delivering necessary upgrading materials for the upgrading of the memory device to be performed by the customer himself is managed according to the customer database, and wherein the upgrading is performed on the memory device for which a collection request is received from the customer to which the upgrading materials were delivered.

With this invention, in addition to the function described above, the business that performs the upgrade of navigation data sends the upgrade materials to the customer who applied for the upgrade, and then after that, upon receiving the request for collection, the business collects the memory from the customer and performs the upgrade work. Therefore, the customer uses the upgrade materials, for example, with the memory removed and ready for collection, it is possible to improve the efficiency of the work by the customer as well as the work by the business.

In further aspect of the present invention, a collection request from the customer, the work of collecting the memory device and the work of returning the memory device after the upgrading is performed by a business that is entrusted with removing and installing the memory device.

With this invention, the customer that applied for an upgrade does not remove or install the memory by himself, but requests the work to be performed by a specific business, and then the business performs all the aforementioned work. Therefore, in the case that the customer is not accustomed to handling the memory, it is possible to lighten that burden and smoothly perform all of the upgrade work.

In further aspect of the present invention, the memory device is a hard disk.

With this invention, a hard disk is used as the memory of the navigation apparatus, so it is possible to freely save a large amount of navigation data as well as the customer's own user data on a widely used typical hard disk, and it is possible to relieve the work of both the customer and business for rewriting the hard disk.

The above object of the present invention can be achieved by an apparatus of the present invention for saving user data that temporarily saves user data when writing over and upgrading navigation data in a memory device, which is installed in a navigation apparatus such that it can be freely installed and removed and which stores rewritable navigation data and user data. The apparatus is provided with: a backup memory device for temporarily saving the user data that are stored in the memory device; a user data save control device for checking the memory status of the memory device that was removed from the navigation apparatus to determine whether there are the navigation data to be upgraded and the user data to be saved, and for saving the user data that are stored in the memory device in the backup memory device as saved data, depending on the result of the determination; and a user data rewrite control device for reading the saved data, which correspond to the memory device in which the navigation data have been written over, from the backup memory device and for rewriting the saved data in the memory device as the user data.

With this invention, when upgrading the navigation data in the memory, there is an apparatus for saving user data that executes the processes described above for saving and rewriting the user data, and when performing an upgrade, the user data that must be saved is temporarily saved in the backup memory of the apparatus for saving user data. Therefore, when executing the many processes on the line for performing the upgrade, it is possible to improve the work efficiency by giving many functions to the apparatus for saving user data.

In one aspect of the present invention, the backup memory device comprises the memory device.

With this invention, the apparatus for saving user data described above has a memory that is the same as that of the navigation apparatus, and the backup memory is constructed such that it uses the hard disk to be upgraded, so it is possible to keep the cost of the line for performing the upgrade to a minimum.

In another aspect of the present invention, a hard disk is used as the backup memory device and the memory device.

With this invention, a hard disk is used as the memory of the navigation apparatus, and at the same time, a hard disk is also used as the back memory, so it is possible to freely save the customer's unique user data using a typical hard disk, as well as to back up that data, therefore it is possible to keep a large amount of user data.

DESCRIPTION OF THE PREFERRED EMBODIMENTS

The preferred embodiments of the invention will be explained based on the drawings.

Figure 1:
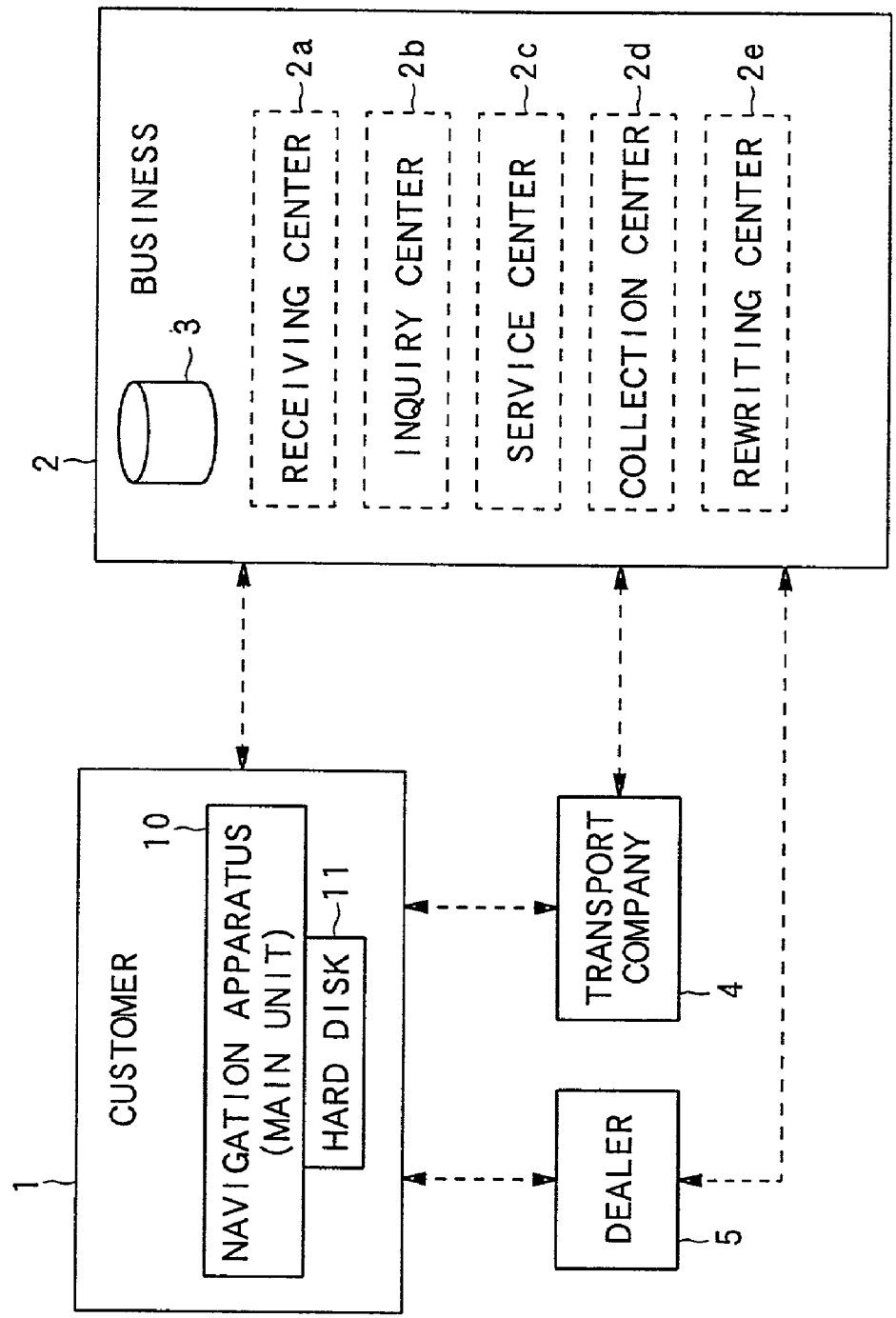
FIG. 1 is a block diagram explaining the relationships between the customer, business and other related businesses in the upgrade work of this invention.
Figure 2:
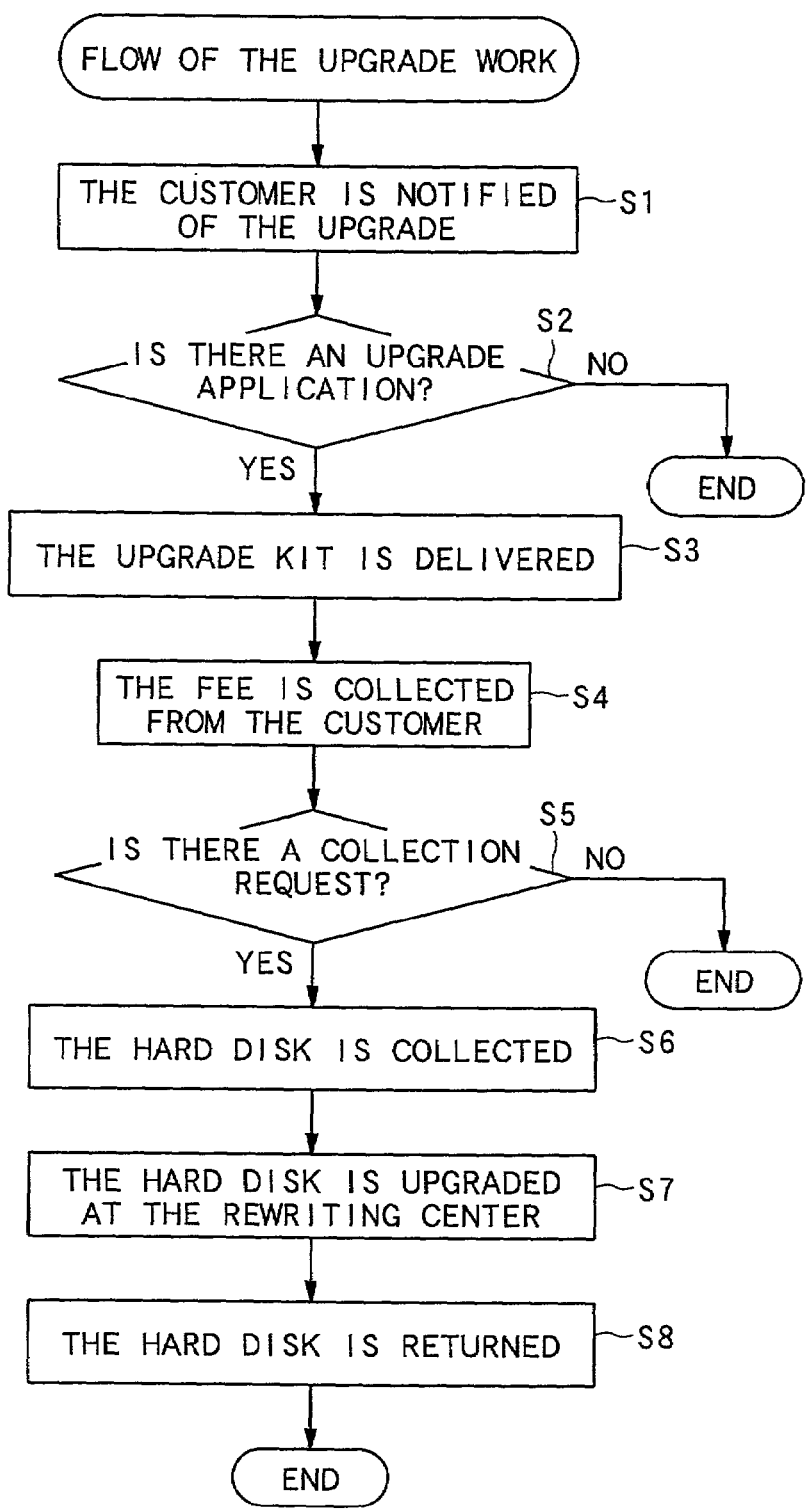
FIG. 2 is a flowchart explaining the flow of the upgrade work.
Figure 3:
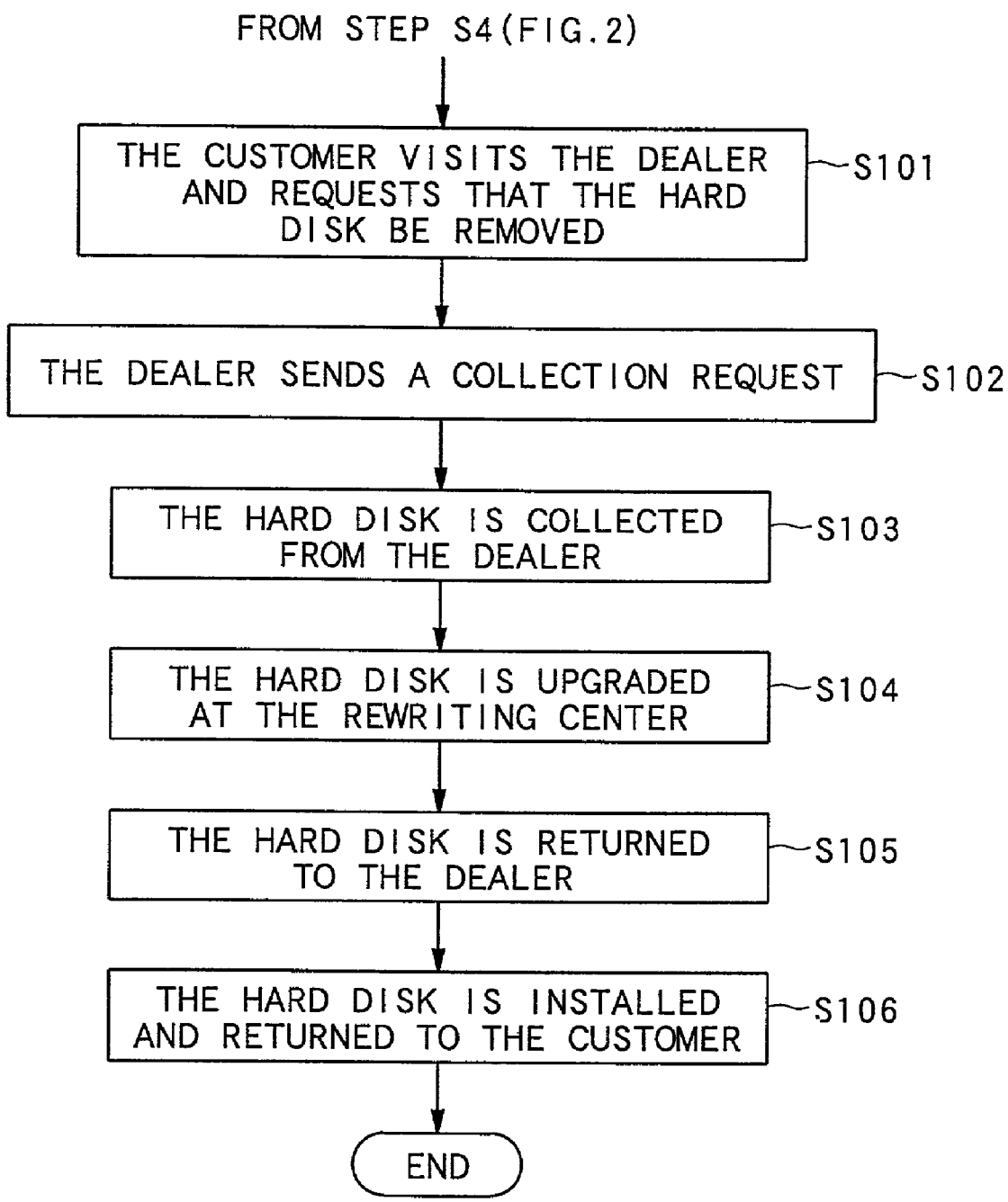
FIG. 3 is a flowchart that shows the flow of the upgrade work when there is a dealer between the customer and the business.

First, FIG. 3 and FIG. 2 will be used to explain the overall flow the necessary upgrade work of the upgrade method of this invention. FIG. 1 is a block diagram that explains the relationship between the customer, who is actually using the upgrade, the business, which performs the upgrade work, and other related businesses. FIG. 2 is a flowchart that explains the flow of the upgrade work.

In FIG. 1, the customer 1 owns a navigation apparatus 10 that was manufactured and sold by the business 2. This navigation apparatus 10 is installed, for example, in the automobile of the customer 1, and it is an apparatus that performs navigation by detecting the automobiles position and providing guiding instructions. When performing navigation with the navigation apparatus 10, map data are required, and generally an optical disk, such as a CD or DVD on which the map data are recorded, is used. In this embodiment, it is assumed that the navigation data, such as map data, are recorded on a hard disk 11 that is used as a memory. When compared with an optical disk, the hard disk is better from the aspect of high-speed access to the stored contents, so it is possible to perform navigation more pleasantly.

The hard disk 11 is freely installed in or removed from the navigation apparatus 10 by way of a connector, and it has a storage capacity of about 10 GBytes. Of this storage capacity, about 80% is allotted as the area for saving navigation data, and it is possible to write user data in the remaining area. The navigation data include map data and all kinds of other data that are related to the navigation function, and the user data are data such as music data that are collected by the user and that can be stored on the hard disk 11. Also, at the beginning, there is one hard disk 11 installed in the navigation apparatus 10, however, it is possible to add a second hard disk 11 in order to increase the area for user data.

When the customer purchases the navigation apparatus 10, navigation data are already recorded on the hard disk 11. However, after using the navigation apparatus 10 over a certain period of time, the navigation data become old and it becomes necessary to upgrade the data in order to correspond to the most recent road conditions. In this case, if the recording medium is an optical disk, for example, it is only necessary to replace the disk with an upgraded disk, however, in the case of a hard disk 11, the work of upgrading the navigation data becomes more complicated. In this embodiment, in order for it to be possible to upgrade the navigation data on the hard disk 11 without increase the burden on the customer 1, the business 2 provides the upgrading work that will be described later.

Next, the business 2 performs the work related to manufacturing and selling the navigation apparatus 10, as well as the work of upgrading the hard disk 11. In order to manage the upgrade work, the business 2 stores customer data about the customer that purchased the navigation apparatus 10 in a customer database 3. The customer data that are stored in this customer database 3, include for example, the customer's name, address, purchase data, model of navigation apparatus 10, and version information, and can be referenced as needed when performing the series of upgrade work.

As shown in FIG. 2, the sections at the business 2 related to upgrade work includes a reception center 2a, inquiry center 2b, service center 2c, collection center 2d, and rewriting center 2e. The role of each of these sections will be described later. In the example shown in FIG. 2, shows the case of having each section inside the business 2, however, it is possible for part of the work to be entrusted to another outside business. Also, in FIG. 2, businesses that are contracted by the business 2 to perform related work include, a transport business 4 and dealer 5, and their role will be described later.

Next, the flow of the upgrade work that is performed by the internal sections of the business 2 and other outside businesses will be explained. The form of the upgrade work of this embodiment takes on many forms according to the desires of the customer 1. Of these, FIG. 2 shows a flowchart of the chronological order of the flow corresponding to the basic form of upgrade work. In the flowchart shown in FIG. 2, it is assumed that the customer 1 has already purchased the navigation apparatus 10 with hard disk 11.

First, when it is time for upgrading the navigation data that are recorded on the hard disk 11, the business 2 references the customer database 3 and determines the customer 1 that owns the navigation apparatus 10, and notifies that customer 1 about the upgrade of the navigation data (step S1). The notification sent to the customer 1 about the upgrade, can be sent, for example, by direct mail or by e-mail over the Internet.

The notification of step S1 gives a description of the upgrade of the navigation data, the application method, information about the distribution of the required upgrade kit for performing the upgrade, and information about the upgrade fee. The reception center 2a checks whether or not an application for an upgrade has been received from customer 1 (step S2). The application for an upgrade from the customer 1 can be received, for example, by telephone, fax, or e-mail over the Internet.

When an application for an upgrade is not received from the customer 1 (step S2: NO), the upgrade work is not performed and the process ends. On the other hand, when an application for an upgrade is received from the customer 1 (step S2: YES), the upgrade kit mentioned above is sent to the customer 1 (step S3). Actual shipping in step S3 is entrusted to the transport company 4 shown in FIG. 1, and it manages the entire shipping of the upgrade kit, such as performing centralized management of the number of the shipping slip with linking the customer information from the customer database to the number.

The upgrade kit contains a container for the hard disk 11 that is removed from the navigation apparatus 10, and materials for protecting the hard disk 11 terminals during shipping. After the customer 1 removes the hard disk 11 that is installed in the navigation apparatus 10, the customer 1 uses the materials included in the upgrade kit to package the hard disk 11, and then waits for the hard disk 11 to be collected according to the collection request described later.

When sending the upgrade kit in step S3, the fee for the upgrade to be paid by the customer 1 is also collected (step S4). As the method of payment, the customer 1 can select whether to pay the transport company 4 COD at the time of delivery, or to pay via credit card. The business 2 handles the shipping slip according to the method of payment, and can perform the centralized management of all sales for the upgrade work. It is also possible for the customer 1 to pay electronically via the Internet.

Next, the collection center 2d checks whether or not a request for collecting the hard disk 11 for upgrade has been received from the customer 1 (step S5). The collection request from the customer 1 can be received, for example, by telephone, fax or by e-mail over the Internet. In this case, in step S3, for example, it is necessary to notify the customer 1 of the method for making the collection request and where to send the request. The collection center 2d references the customer database 3 when a collection request is received from the customer 1 to obtain the required customer information, and manages the day-by-day work of collecting hard disks 11.

When no collection request is received from the customer 1 (step S5: NO), the process shown in FIG. 2 ends without performing the upgrade work, however, it is possible that upgrading could be performed according to a different process (see FIG. 3 or FIG. 4) to be described later. On the other hand, when a collection request has been received from the customer 1 (step S5: YES), the collection center 2d sends instructions to the transport company 4 and performs the work for collecting the hard disk 11 (step S6). It is preferred that the customer 1 be asked for a desired collection date before collecting the hard disk 11. On the desired collection date, the transport company 4 visits the address matching the customer data and collects the hard disk 11 to be upgraded.

Next, the hard disk 11 that is collected from the customer 1 is received by the rewriting center 2e, and the hard disk 11 is upgraded (step S7). In this embodiment, many hard disks 11 are handled, so in order to improve work efficiency, a series of upgrade processes are executed on a line, and details of those process will be described later. The rewriting center 2e manages several upgraded hard disks 11 every day, and performs management work in order to properly meet the delivery deadline and maintain product quality.

After the upgrade in step S7 has been completed, the collection center 2d takes over the upgraded hard disk 11, and sends instructions to the transport company 4 to return the hard disk 11 to the customer (step S8). It is preferable that the customer be notified by telephone or the like before returning the hard disk 11 in order to make sure the customer 1 is at home. The transport company 4 goes to the address that corresponds to the customer information and returns the upgraded hard disk 11, and the upgrade process shown in FIG. 2 is completed. In the basic process shown in FIG. 2, it is assumed that the customer 1 will install the hard disk 11 in the navigation apparatus 10.

Here, in the case that the customer 1 is unclear about any of the processes in the series of upgrade processes shown in FIG. 2, he/she can contact the inquiry center 2b. For example, it is possible to ask for instructions on how to remove or install the hard disk 11 in the navigation apparatus 10, or how long it will take for the upgrade. The inquiry center 2b gives proper advice in regard to inquiries from the customer 1, however in the case that it is difficult for them to handle the inquiry completely, they may introduce the service center 2c to the customer 1.

With the upgrade work explained above, it is possible to smoothly perform the work of collecting and returning the hard disk 11 to the customer 1, who desires the navigation data to be upgraded, as well as the work of collecting the fee for the upgrade, and it is possible to manage all of the work based on the customer database 3. Moreover, since the upgrade work and all related work are performed mainly by the business 2, it is possible to keep intermediate costs required for the upgrade of navigation data to a minimum. Also, in addition to keeping upgrade costs down for the customer 1, there is a large merit in that it is possible to leave the user's own user data intact on the collected hard disk 11.

Next, in regards to the upgrade work of this embodiment, there are also other variations of the work other than the basic process shown in FIG. 2. Next, FIG. 3 and FIG. 4 will be used to explain variations of the upgrade work.

FIG. 3 is a flowchart that shows the flow of the upgrade work when there is a dealer 5 in between the customer 1 and business 2. In FIG. 3, steps S1 to S4 are performed the same as in the basic process shown in FIG. 2.

However, in step S4, when the customer 1 receives the aforementioned upgrade kit and is not comfortable handling the hard disk 11, it can be assumed that there will be cases when the customer 1 will want to entrust a third party to remove the hard disk 11 from the navigation apparatus 10. In this case, as shown in FIG. 3, the customer 1 calls on the dealer 5 and requests removal of the hard disk 11 for the purpose of having it upgraded (step S101).

After the dealer 5 has removed the hard disk 11 from the navigation apparatus 10 that has been installed, for example, in the customer's car, the dealer 5 sends a collection request to the collection center 2d of the business 2 to have the hard disk 11 collected (step S102). The fee for removing the hard disk 11 in this case is paid by the customer 1 directly to the dealer 5, and this fee is separate from the upgrade fee itself.

When the collection center 2d receives the collection request in step S102, they send an instruction to the transport company 4 to collect the hard disk 11 that belongs to the customer 1 from the dealer 5 (step S103). Then, in the same way as in step S7 (see FIG. 2), the rewriting center 2e upgrades the hard disk 11 (step S104).

The collection center 2d then sends an instruction to the transport company 4 to return the upgraded hard disk 11 to the dealer 5 (step S105). When the customer 1 receives notice from the dealer 5, he visits the dealer 5 again and the upgraded hard disk 11 is installed and finally returned to the customer 1 (step S106).

Figure 4:
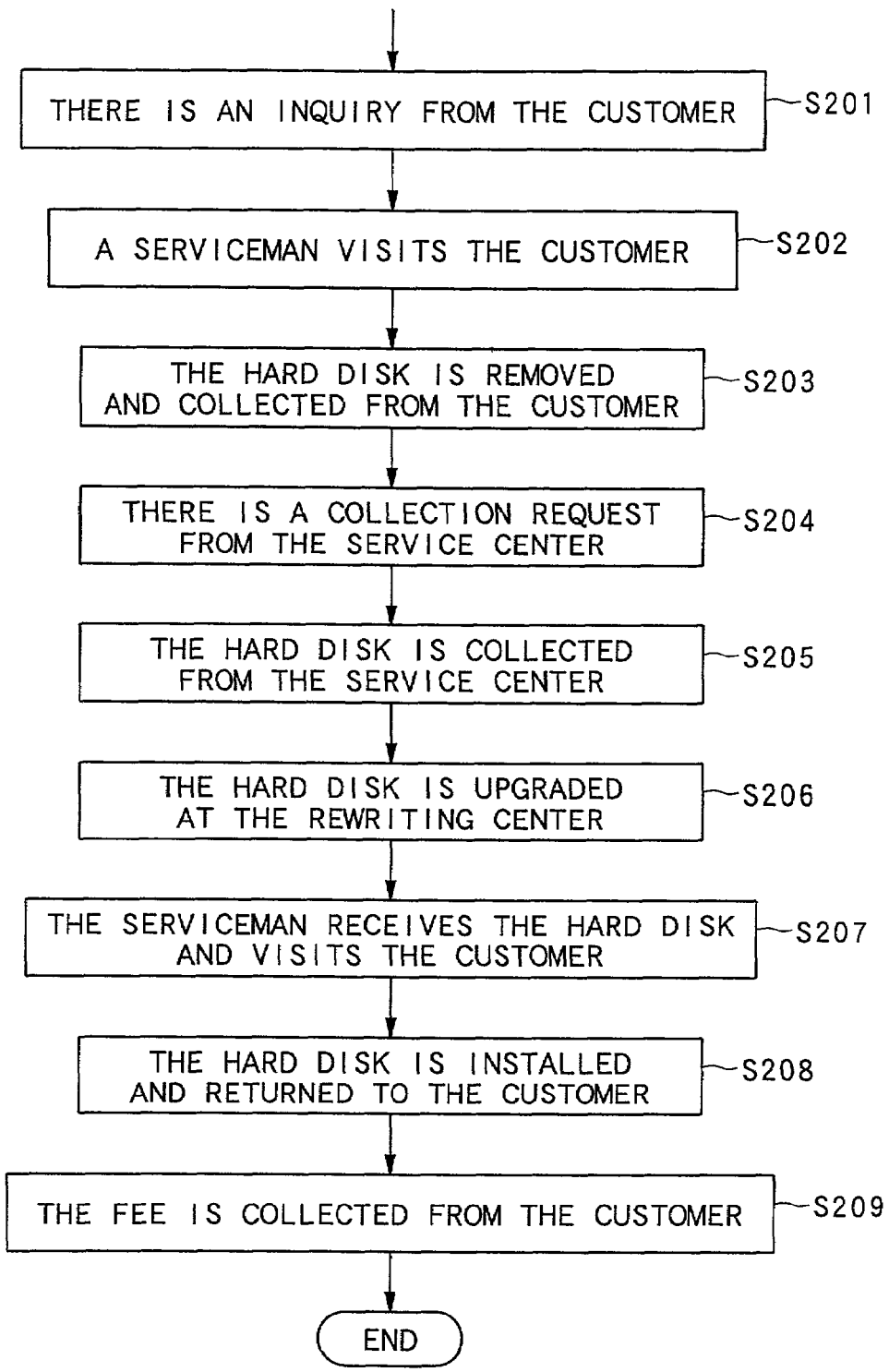
FIG. 4 is a flowchart that shows the flow of the upgrade work when there is a serviceman from a service center between the customer and the business.

Next, FIG. 4 is a flowchart that shows the flow of the upgrade work in the case when there is a serviceman from the service center 2c in between the customer 1 and the business 2. In FIG. 4, the customer 1, who received an upgrade notice in step S1 (see FIG. 2), consults with or makes an inquiry to the inquiry center 2b directly about the upgrade (step S201). In this case, the customer 1 has the inquiry center 2b introduce a serviceman for removing and installing the hard disk 11, and the work proceeds from there.

An authorized serviceman that is visits the customer 1 according to the request to a request from the inquiry center 2b to the service center 2c (step S202). This serviceman removes the hard disk 11 from the navigation apparatus 10 that has been installed, for example, in the customer's car, then collects the hard disk 11 (step S203) and stores it at the service center 2c.

Next, the service center 2c sends a collection request to the collection center 2d of the business 2 to collect the hard disk 11 (step S204). When the collection center 2d receives the collection request, they send an instruction to the transport company 4 to collect the hard disk 11 that belongs to the customer 1 from the service center 2c (step S205). Then, in the same way as in step S7 (see FIG. 2), the rewriting center 2e upgrades the hard disk 11 (step S206).

The collection center 2d then instructs the transport company 4 to deliver the upgraded hard disk 11 to the service center 2c, and the serviceman, who was in charge of getting the hard disk 11, visits the customer 1 again (step S207). The serviceman then installs the hard disk 11 and finally returns the hard disk 11 to the customer (step S208). After that, the upgrade fee is collected from the customer 1 in the same was as in step S4 in FIG. 2 (step S209).

The upgrade work shown in FIG. 3 and FIG. 4 differs from the work shown in FIG. 2 in that the customer 1 does not need to remove the hard disk 11 from the navigation apparatus 10 or install it. Therefore, when the customer removes and installs the hard disk 11 himself, the process shown in FIG. 2 can be selected, and when that work is difficult for the customer 1, it is possible to select the process shown in FIG. 3 or FIG. 4. Therefore, it is possible to reduce the burden on the customer 1 when upgrading the navigation data.

Figure 5:
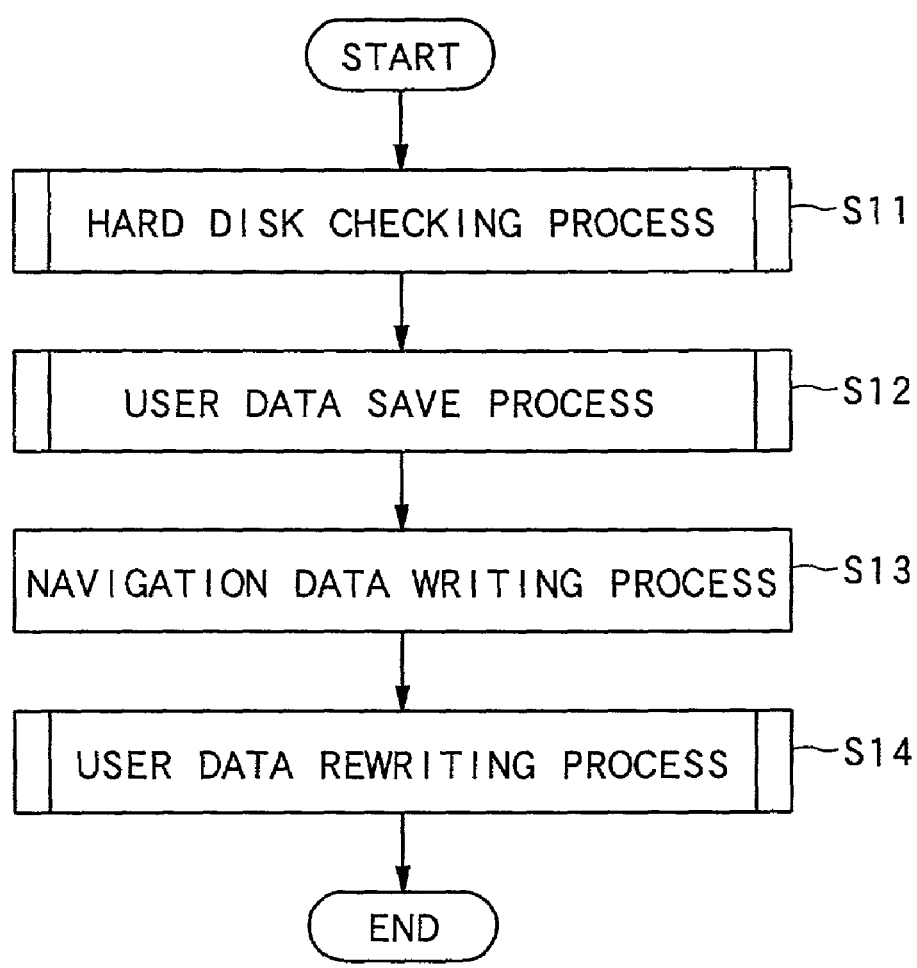
FIG. 5 is a flowchart that shows the overall upgrade process that is performed by the rewriting center.

Next, details of the upgrade processes that are performed by the rewriting center 2e corresponding to step S7 in FIG. 2 (step S104 in FIG. 3, and step S206 in FIG. 4) will be explained using FIG. 5 to FIG. 9. FIG. 5 is a flowchart that gives a summary of the overall upgrade processes that are performed by the rewriting center 2e. Features of the upgrade processes in this embodiment are rewriting of navigation data on the hard disk 11 and retaining user data that were recorded by the user.

As shown in FIG. 5, the upgrade processes of this embodiment are divided into four main processes. First, in step S11, each hard disk 11 that is delivered for upgrade is checked. In other words, the hard disk 11 that is to be upgraded is checked as to whether or not there are navigation data to be upgraded, and the state of the hard disk 11 memory is checked to determine whether or not there are user data that need to be saved.

Figure 6:
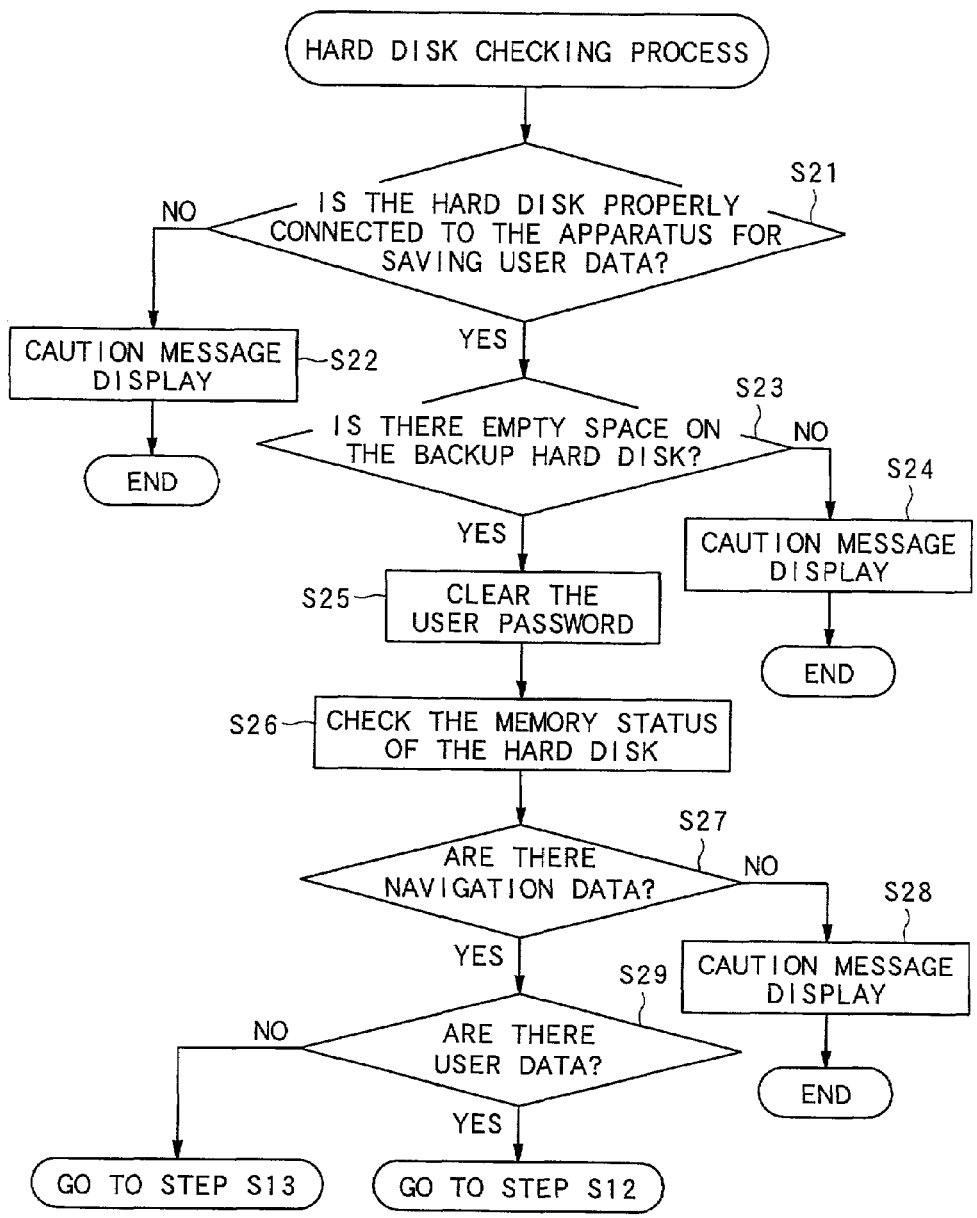
FIG. 6 is a flowchart that explains the process of checking the hard disk.

FIG. 6 is a flowchart that explains the process of checking the hard disk 11 in step S11. In FIG. 6, when the hard disk 11 to be upgraded is placed on the line at the rewriting center 2e, the hard disk 11 and the backup hard disk are check as to whether or not they are connected properly to the apparatus for saving user data (step S21). The apparatus for saving user data is a device special for this line, and it comprises a backup hard disk for saving the user data that are recorded on the hard disk 11.

Figure 7:
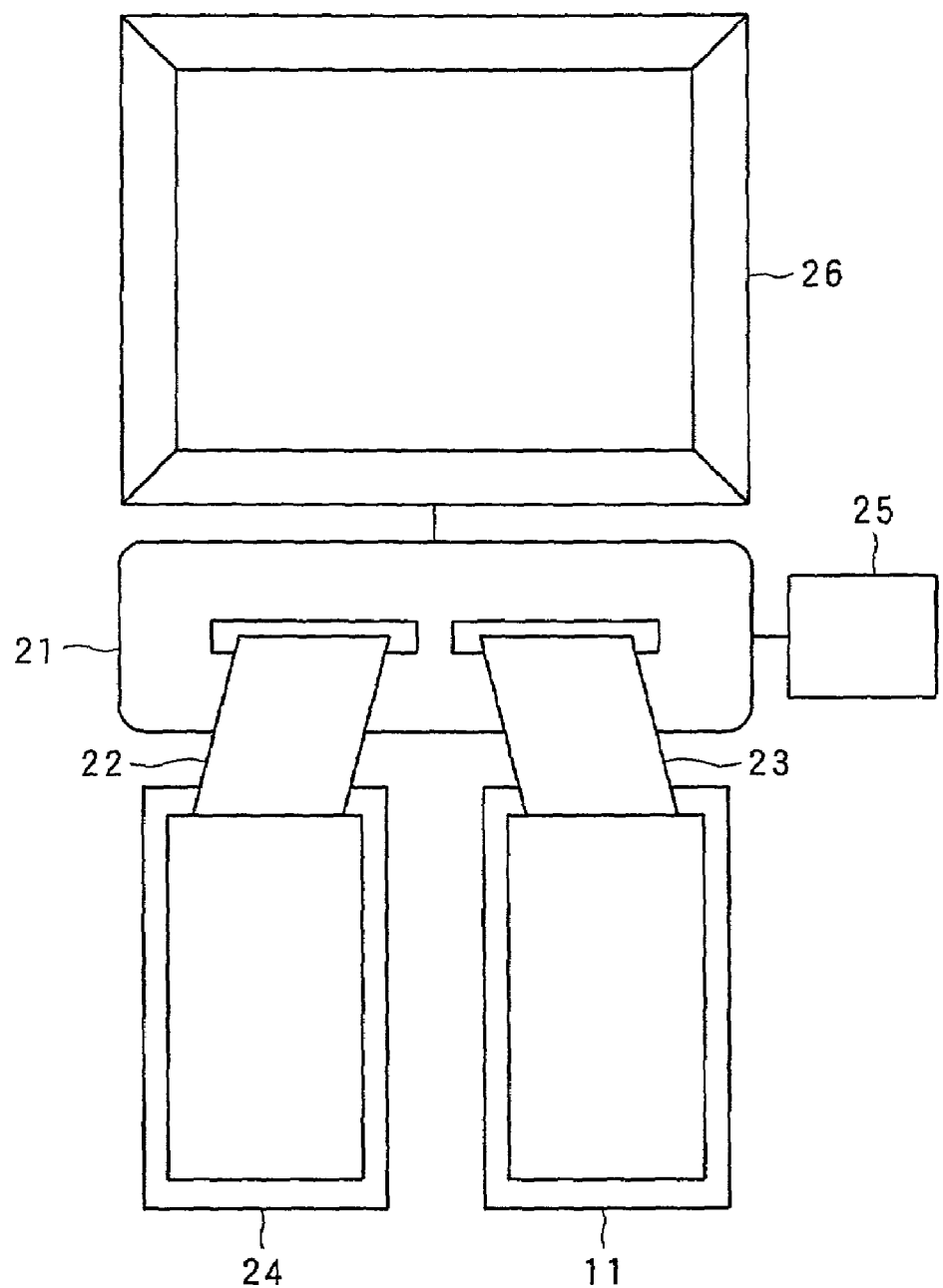
FIG. 7 is a drawing that shows an external view of the apparatus for saving user data.

The exterior of the apparatus for saving user data is shown in FIG. 7. As shown in FIG. 7, there are two connectors 22, 23 on the main body of the apparatus for saving user data 21, and the backup hard disk 24 is connected to one of the connectors 22. Also, the hard disk 11 to be upgraded is connected to the other connector 23, and the checking process of step S21 is performed in this state. Also, the apparatus for saving user data 21 is connected to a power supply 25 for supplying power, and to a display 26 for performing various display. This display 26 is used for displaying cautions to the worker when abnormalities are detected during the process.

It is possible to use part of the navigation apparatus as the apparatus for saving the user data shown in FIG. 7. In other words, it is possible to replace the actual control program in the navigation apparatus 10 with the program for this process, and it is possible to make changes in the construction such that the components mentioned above can be connected and such that it can be used as the apparatus for saving user data. Moreover, it is also possible to use a hard disk that is the same as the hard disk 11 to be upgraded as the backup hard disk 24. In this way, it is possible to reduce the cost burden and improve the work efficiency when setting up many apparatuses for saving user data.

In the check of step S21, when the hard disk 11 and backup hard disk 24 are not properly connected to the apparatus for saving user data (step S21: NO), a caution message is displayed on the display 26 (step S22), and further processing ends. It is possible to save user data from a plurality of hard disks 11 on the backup hard disk 24 depending on the memory capacity, and after being connected to the connector 22, that state is maintained as long as there is memory capacity.

On the other hand, in the check of step S21, when it is confirmed that the connection is proper (step S21: YES), then a check is performed to check whether or not there is empty space in the backup hard disk 24 (step S23). As mentioned above, due to limitations of the memory capacity of the backup hard disk 24, after a certain amount of user data from the hard disks 11 have been recorded, it is necessary to replace the backup hard disk 24. For example, the storage capacity can be divided such that the user data from eight hard disks 11 can be saved. When doing this, there is one directory for the user data from each hard disk 11, so it is possible to perform the check in step S23 based on the number of directories 24 of the backup hard disk 24.

As a result of the check in step S23, when there is no empty space in the backup hard disk 24 (step S23: NO), a caution message is displayed on the display 26 to replace the backup hard disk 24 (step S24), and further processing ends. On the other hand, when there is empty space in the backup hard disk 24 (step S23: YES), the user password that is set for the hard disk 11 is cleared using a master password (step S25). In other words, a unique user password is set in the hard disk 11 of this embodiment that allows access to the navigation apparatus 10 of a specific customer 1. Therefore, step S25 is necessary in order to enable reading of the hard disk 11 by clearing the user password.

Next, the hard disk 11 is accessed and the memory status is checked (step S26). In detail, the hard disk 11 is checked to determine whether or not there are navigation data saved, and to determine whether or not there is a user data director for saving user data. In this way it is possible to determine beforehand whether or not to rewrite the navigation data or to save the user data in the following processing.

The processing in steps S27 to S29 is executed depending on the results of the check in step S26. When it is determined in step S27 that there are no navigation data saved on the hard disk 11 (step S27: NO), a caution message indicating that is displayed on the display 26 (step S28), and further processing ends. On the other hand, when it is determined that there are navigation data saved on the hard disk 11 (step S27: YES), processing advances to step S29.

In step S29, when it is determined that there is a directory for user data on the hard disk 11 (step S29: YES), processing moves to a process in step S12 (see FIG. 5) of saving the user data. On the other hand, when it is determined that there is no directory for user data on the hard disk 11 (step S29: NO), there is no need to save user data, so processing moves to the process in step S13 (see FIG. 5) of rewriting the navigation data. In the place of the judgment in step S29, it is possible to move to the process for saving user data, even when there is no directory for user data, and just not actually save any user data.

Returning to FIG. 5, the user data that are recorded on the hard disk 11 are saved in step S12. In other words, the entire directory of user data are temporarily saved in the backup hard disk 24 so that the user data recorded by the customer 1 is not deleted during upgrading of the hard disk 11.

Figure 8:
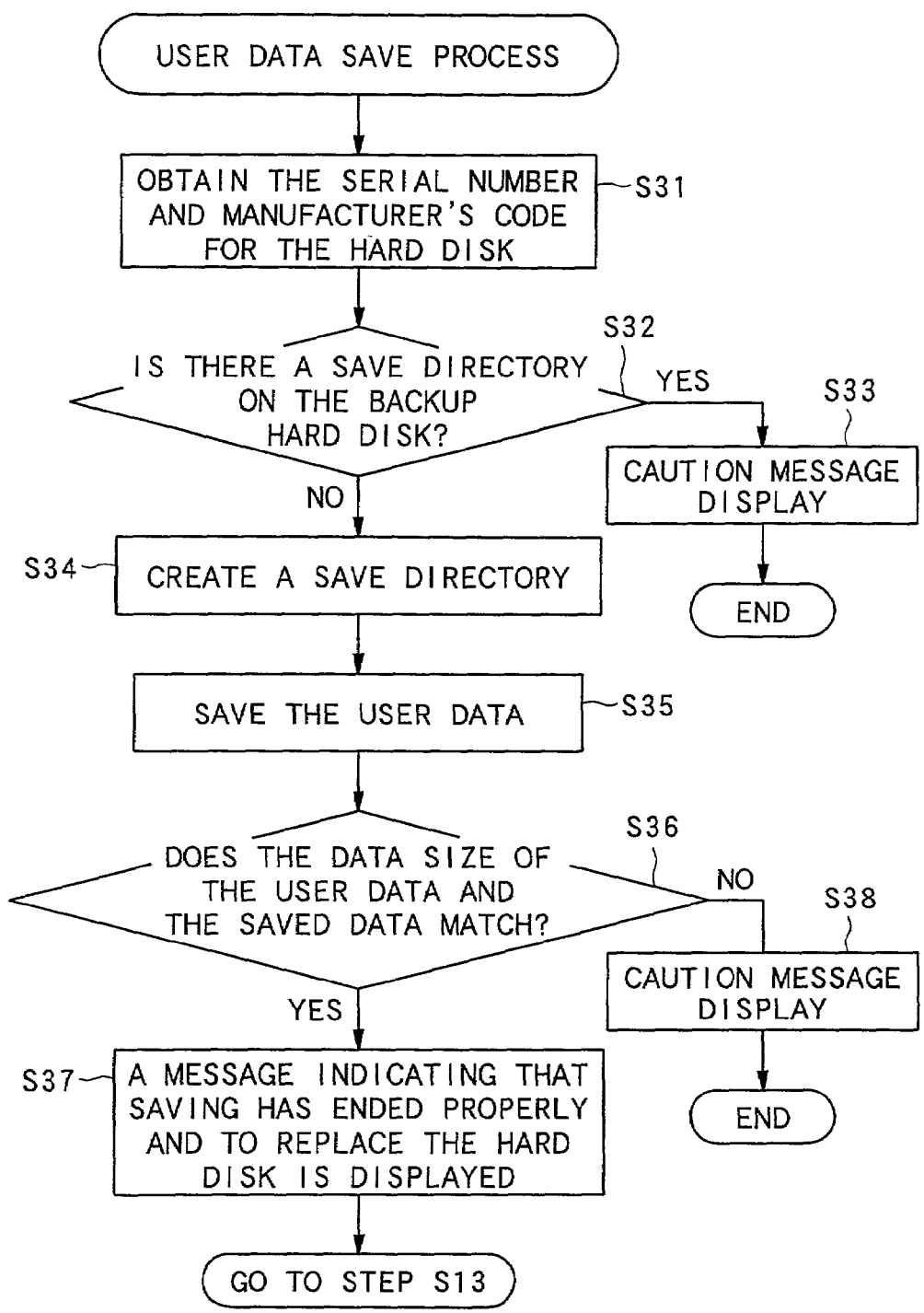
FIG. 8 is a flowchart that explains the process of saving user data.

FIG. 8 is a flowchart that explains the process of saving user data in step S 12. In FIG. 8, the serial number and manufacturer's code that are given to the hard disk 11 to be upgraded are obtained (step S31). The serial number and manufacturer's code are contained on the backup hard disk 24 as control data to form a correlation with the user data on the hard disk 11 to be upgraded. As will be described later, there is a specific directory for saving the user data from the hard disk 11, so, for example, by giving a name to this directory that includes the serial number and manufacturer's code, it is possible to easily identify the saved user data.

Next, the backup hard disk 24 is accessed and check to determine whether or not there is a save directory that is related to the serial number and manufacturer's code of the hard disk 11 to be upgraded (step S32). In other words, assuming that the user data from the hard disk 11 to be upgraded have already been saved in the backup hard disk 24, this process makes it possible to avoid unnecessary processing. When it is determined as a result of the check that there is already a directory for saving user data from the hard disk 11 to be upgraded (step S32: YES), a caution message to indicate that and to replace the hard disk 11 is displayed on the display 26 (step S33), and further processing ends.

On the other hand, when there is no directory for saving user data from the hard disk 11 (step S32: NO), a save directory, which is given a name that includes the serial number and manufacturer's code corresponding to the hard disk 11 to be upgraded, is created on the backup hard disk 24 before saving the user data (step S34).

Next, in order to save the user data, the hard disk 11 to be upgraded is accessed and the user data from the directory for user data are read and then written as save data in the corresponding save directory on the backup hard disk 24 (step S35). After doing this, save data that are the same as the user data to be saved are stored on the backup hard disk 24. During the processing in step S35, is preferred that a message indicating that copying is in progress be displayed on the display 26. Also, in the case that copying is interrupted due to some malfunction during the processing of step S35, it is preferred that a caution message indicating the malfunction be displayed on the display 26, and further processing ends.

Next, the data size of the original user data on the hard disk 11 and the saved data in the save directory on the backup hard disk 24 are compared to determine whether or not they match (step S36). By doing this, it is possible to check whether or not any data are missing after the save process in step S35. When the results shows that the data size of the user data and save data match (step S36: YES), a message indicating that copying was completed properly and to replace the hard disk 11 is displayed on the display 26 (step S37), and then processing moves to the process in step S13 (see FIG. 5) to rewrite the navigation data. On the other hand, when the data size of the user data and save data does not match (step S36: NO), a caution message indicating that is displayed on the display 26 (step S38), and further processing ends.

Next, returning to FIG. 5, in step S13, the process for rewriting the navigation data saved on the hard disk 11 is executed. In other words, in the place of the old navigation data on the hard disk 11, the upgraded navigation data are newly written. In the rewriting process of step S13, when the hard disk 11 is removed from the apparatus for saving user data 21, the recording apparatus performs general initialization and writes then new navigation data. At this point, the upgraded navigation data have been recorded on the hard disk 11, and all of the original user data have been deleted.

Next, in step S14, the process of writing the save data from the backup hard disk 24 is executed. As mentioned above, it is necessary to restore the user data that were deleted in step S13 to the way they were originally, so the processing of step S12 is performed in reverse.

Figure 9:
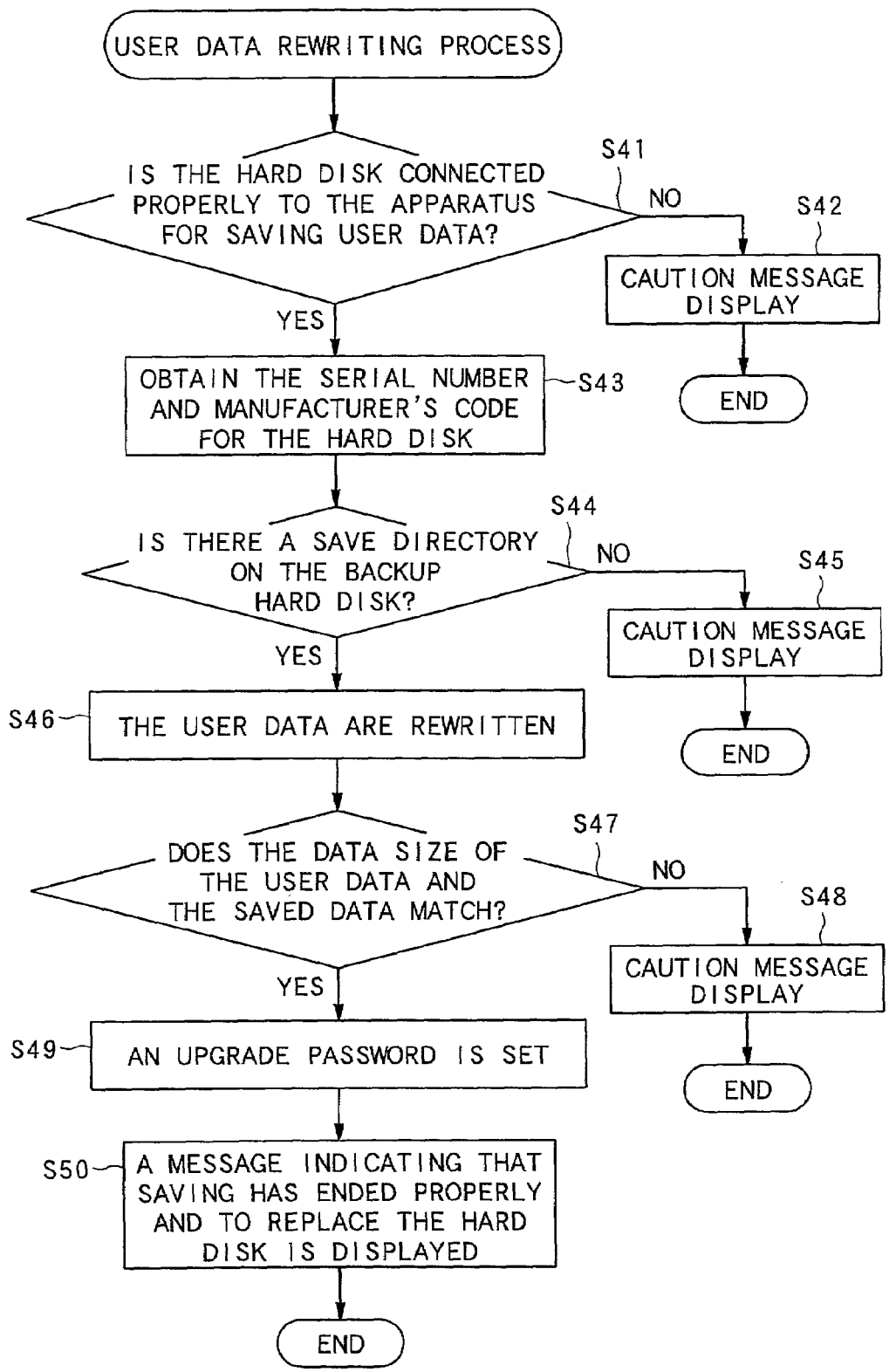
FIG. 9 is a flowchart that explains the process of rewriting the user data.

FIG. 9 is a flowchart that explains the process of writing the user data in step S14. In FIG. 9, it is necessary to once again connect the hard disk 11 after upgrading to the apparatus for saving user data, so a check is performed to determine whether or not the hard disk 11 and backup hard disk 24 are properly connected (step S41). When it is determined as a result that the hard disk 11 and backup hard disk 24 are not properly connected to the apparatus for saving user data (step S41: NO), a caution message indicating that is displayed on the display 26 (step S42), and further processing ends.

In the check of step S41, when it is confirmed that connection is proper (step S41: YES), the same process as step S31 in FIG. 8 is performed and the serial number and manufacturer's code that is given to the hard disk 11 is obtained (step S43). Next, the backup hard disk 24 is accessed and checked to determine whether or not there is a save directory that is related to the serial number and manufacturer's code of the hard disk 11 (step S44). In other words, in saved data that correspond to the user data are saved in the save directory that was created in step S34 shown in FIG. 8, so whether that directory exists is checked.

As a result of the check in step S44, when there is no save directory on the backup hard disk 24 (step S44: NO), user data cannot be written, so a caution message indicating that and to replace the hard disk 11 is displayed on the display 26 (step S45), and further processing ends. On the other hand, when there is a save directory on the backup hard disk 24 (step S44: YES), and writing of the user data is executed (step S46).

In detail, the backup hard disk 24 is accessed, and then the saved data are read from the saved directory and written to the user data directory that is created on the hard disk 11. In this way, the user data are written again on the hard disk 11 together with the upgraded navigation data. During the processing of step S46, it is preferred that a message indicating that copying is in progress be displayed on the display 26. Also, in the case that copying is interrupted due to some malfunction during the processing of step S46, it is preferred that a caution message indicating the malfunction be displayed on the display 26, and in that case further processing ends.

Next, the data size of the user data that were rewritten on the hard disk 11 is compared with that of the saved data in the save directory on the backup hard disk 24 to determine whether or not they match (step S47). This process is the same as the process in step S36 of FIG. 8. As a result of the check in step S47, when it is determined that the data size of the user data and saved data do not match (step S47: NO), a caution message indicating that is displayed on the display 26 (step S48), and further processing ends.

On the other hand, when it is determined as a result of the check in step S47 that the data size of the user data and saved data match (step S47: YES), an upgrade password is set for the hard disk 11 (step S49). This upgrade password is a password for allowing one-time access of the upgraded hard disk 11 after it has been installed in the navigation apparatus 10. In other words, the user password that was set originally is cleared, however, in this state it is not possible to access the hard disk 11 when installed in the navigation apparatus 10. Therefore, the upgrade password allows one-time access of the hard disk 11 when installed in the navigation apparatus 10, and is effective when automatically setting the original user password in the navigation apparatus 10 after that.

Finally, a message is displayed on the display 26 indicating that the process for writing user data is finished and to replace the hard disk 11 (step S50), and then the process for upgrading the hard disk 11 ends. After that, by repeating the process shown in FIG. 5 to FIG. 9 for another hard disk 11, it is possible to upgrade a plurality of hard disks 11.

As explained above, with the upgrade process by the rewriting center 2e explained above, when there are user data that were recorded by the customer 1 on the hard disk 11 to be upgraded, it is possible to rewrite the navigation data only while retaining the user data. Therefore, there is a large merit for the customer in that the customer 1 does not have to perform a backup of the user data before the upgrade, and since the customer's own user data are left on the hard disk 11, the data can continued to be used.

With this invention, as explained above, user data are saved when upgrading the navigation data of the non-volatile memory installed in the navigation apparatus, and rewritten after the navigation data have been written over, so in the case when the customer has a large amount of important user data stored in the non-volatile memory, it is possible to upgrade the navigation data and keep the user data without having to delete it.

Also, with this invention, the process of managing the upgrade of navigation data can also be performed efficiently when handling a plurality of hard disks, making it possible to keep down the cost burden.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Applications No. 2001-137853 filed on May 8, 2001 and No. 2001-137852 filed on May 8, 2001 including the specification, claims, drawings and summary is incorporated herein by reference in its entirety.

What is claimed is:

1. A upgrade method for navigation data that writes over and upgrades navigation data in a memory device, which is installed in a navigation apparatus such that it can be freely installed and removed and which stores rewritable navigation data and user data, the method comprising:

a checking process of checking the memory status of the memory device that is removed from the navigation apparatus and determining whether there are the navigation data to be upgraded and the user data to be saved;

a user data saving process that depending on the results of the checking process saves the user data, which are stored in the memory device, in a backup memory device such that they can be identified as saved data;

a navigation data writing process that depending on the results of the checking process writes over the navigation data, which are stored in the memory device, with upgraded navigation data; and a user data rewriting process of reading the saved data, which correspond to the memory device, from the backup memory device and rewriting the saved data in the memory device as the user data.

2. The upgrade method for navigation data according to claim 1, wherein a unique user password is set for allowing access to said memory device such that in the checking process, the user password is cleared and the memory device is accessed.

3. The upgrade method for navigation data according to claim 2, wherein
an upgrade password is set such that in the rewriting process, it allows the upgraded memory device to be accessed one time only.

4. The upgrade method for navigation data according to claim 1, wherein
a directory for user data is created in the memory device for recording the user data such that in the checking process it is determined whether there are user data to be saved according to whether or not the directory for user data exists in the memory device.

5. The upgrade method for navigation data according to claim 1 wherein
in the checking process a serial number and manufacturer's code that are unique to the memory device are obtained as control data and stored in the backup memory device to connect the control data with the saved data; and wherein
in the rewriting process, said control data are referenced to determine the user data that are to be rewritten from the backup memory device.

6. The upgrade method for navigation data according to claim 1, wherein a hard disk is used as the memory device.

7. A upgrade method for navigation data that writes over and upgrades navigation data in a memory device, which is installed in a navigation apparatus such that it can be freely installed and removed and which stores rewritable navigation data and user data, comprising
a writing over process for writing over the navigation data in the memory device, which has been removed from the navigation apparatus;
a saving process for temporarily saving the user data when writing over the navigation data; and
a rewriting process for rewriting saved user data in the memory device after the navigation data have been written over.

8. The upgrade method for navigation data according to claim 7, wherein
upgrading is performed upon receiving an application for an upgrade from a customer that owns the navigation apparatus, and is performed for the memory device for which a collection request is received, and wherein
execution of the upgrading is managed based on a customer database that contains customer data and where the entire series of work related to the upgrading is managed.

9. The upgrade method for navigation according to claim 8, wherein series of work related to the upgrading comprises: work of collecting the memory device to be upgraded; work of returning the memory device after having been upgraded; and work of collecting the fee for the upgrading.

10. The upgrade method for navigation data according to claim 9 wherein after receiving the application from the customer for the upgrading, work of delivering necessary upgrading materials for the upgrading of the memory device to be performed by the customer himself is managed according to the customer database, and wherein the upgrading is performed on the memory device for which a collection request is received from the customer to which the upgrading materials were delivered.

11. The upgrade method for navigation data according to claim 9, wherein a collection request from the customer, the work of collecting the memory device and the work of returning the memory device after the upgrading is performed by a business that is entrusted with removing and installing the memory device.

12. The upgrade method for navigation data according to claim 7, wherein the memory device is a hard disk.

13. An apparatus for saving user data that temporarily saves user data when writing over and upgrading navigation data in a memory device, which is installed in a navigation apparatus such that it can be freely installed and removed and which stores rewritable navigation data and user data, the apparatus comprising:
a backup memory device for temporarily saving the user data that are stored in the memory device;
a user data save control device for checking the memory status of the memory device that was removed from the navigation apparatus to determine whether there are the navigation data to be upgraded and the user data to be saved, and for saving the user data that are stored in the memory device in the backup memory device as saved data, depending on the result of the determination; and
a user data rewrite control device for reading the saved data, which correspond to the memory device in which the navigation data have been written over, from the backup memory device and for rewriting the saved data in the memory device as the user data.

14. The apparatus for saving user data according to claim 13, wherein the backup memory device comprises the memory device.

15. The apparatus for saving user data according to claim 13, wherein a hard disk is used as the backup memory device and the memory device.

* * * * *